US008553604B2

(12) United States Patent
Kazmi et al.

(10) Patent No.: US 8,553,604 B2
(45) Date of Patent: Oct. 8, 2013

(54) METHOD AND ARRANGEMENT IN A TELECOMMUNICATION SYSTEM

(75) Inventors: Muhammad Kazmi, Bromma (SE); Johan Bergman, Stockholm (SE); Lars Håkan Palm, Växjö (SE); Dirk Gerstenberger, Stockholm (SE); Lars Lindbom, Karlstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 951 days.

(21) Appl. No.: 12/513,096

(22) PCT Filed: Sep. 26, 2007

(86) PCT No.: PCT/EP2007/008397
§ 371 (c)(1),
(2), (4) Date: Apr. 30, 2009

(87) PCT Pub. No.: WO2008/052625
PCT Pub. Date: May 8, 2008

(65) Prior Publication Data
US 2010/0080160 A1    Apr. 1, 2010

(30) Foreign Application Priority Data
Oct. 31, 2006  (SE) ........................................ 0602348

(51) Int. Cl.
*H04H 20/71*    (2008.01)
(52) U.S. Cl.
USPC ........................................................ 370/312
(58) Field of Classification Search
None
See application file for complete search history.

(56) References Cited

U.S. PATENT DOCUMENTS

| | | | |
|---|---|---|---|
| 2008/0081598 A1* | 4/2008 | Chandra et al. | 455/414.1 |
| 2008/0268878 A1* | 10/2008 | Wang et al. | 455/458 |
| 2010/0091720 A1* | 4/2010 | Chun et al. | 370/329 |
| 2010/0167746 A1* | 7/2010 | Lee et al. | 455/450 |
| 2010/0311448 A1* | 12/2010 | Simonsson et al. | 455/466 |

FOREIGN PATENT DOCUMENTS

WO     WO 00/72609 A1     11/2000
WO     WO 2004/102636 A1  11/2004

OTHER PUBLICATIONS

Nokia: "MBMS dedicated carrier and MBMS Control Plane design" 3GPP TSG-RAN WG2 AD-HOC on LTE, [Online] Jun. 27, 2006-Jun. 30, 2006 pp. 1-6, XP002468083 Cannes, France Retrieved from the Internet URL: http://www.3gpp.org/ftp/tsg_ran/WG2_RL2/TSGR2_AHs/2006_06_LTE/Docs/>[retrieved on Feb. 5, 2008] the whole document.
NTT Docomo et al: "MBMS Channel structure for E-UTRA Downlink" 3GPP TSG-RAN WGI Meeting AD HOC LTE, XX, XX, vol. RI-60035, Jan. 23, 2006, pp. 1-4, XP003016964 the whole document.

\* cited by examiner

*Primary Examiner* — Anh-Vu Ly (57)    ABSTRACT

The present invention provides, inter alia, a method of operation of a radio base station in a wireless telecommunications system, in which system information is transmitted on a broadcast control channel. The method comprises the steps of transmitting the broadcast control channel continuously on a first carrier; and also transmitting the broadcast control channel non-continuously and periodically at regular intervals. This prevents or at least minimizes, for example, MBMS data loss when a UE with a single receiver listens to a dedicated MBMS carrier.

27 Claims, 8 Drawing Sheets

METHOD AND ARRANGEMENT IN A TELECOMMUNICATION SYSTEM

FIELD OF THE INVENTION

The present invention relates to BCCH transmission in a cellular mobile communication system.

BACKGROUND

As part of HSPA (High speed packet access) evolution, point to multi-point MBMS (multimedia broadcast multicast service) services will be offered on a dedicated downlink carrier in an entire coverage area termed as single frequency network (SFN). This new SFN feature is in addition to the release 6 type of MBMS transmission mechanism, which takes place on the existing carrier.

This section describes various technological aspects and principles of MBMS transmission in UTRAN (UMTS Terrestrial Radio Access Network).

Release 6 MBMS Transmission

Release 6 supports the following two MBMS transmission modes, see 3GPP TS 25.346, "Introduction of the Multimedia Broadcast/Multicast Service (MBMS) in the Radio Access Network (RAN); Stage 2". 3GPP TS 25.331, "Radio Resource Control Protocol Specifications":

Point to point MBMS transmission
Point to multipoint MBMS transmission

In both the above scenarios the MBMS services are shared with other conventional services such as speech, data etc., on the same carrier.

The point to point MBMS transmission can take place on DCH (Dedicated channel) or HS-DSCH channel (High Speed Downlink Shared Channel). On the other hand, point to multipoint MBMS services are sent on S-CCPCH (Secondary common control physical channel) from multiple cells. In the case of MBMS transmission on S-CCPCH, the UE can combine the MBMS transmissions from more than one cell. Either selective or soft combining is used.

Dedicated MBMS Transmission Via SFN

As part of HSPA evolution there is likely to be a separate dedicated carrier for MBMS transmission. In this scenario MBMS services will be transmitted on one carrier dedicated to MBMS services only. This is only a point to multipoint transmission scenario. This scenario will be characterized by a single frequency network (SFN), enabling SFN combining (i.e. combining in the air). This means the same service should be sent on the same physical resource in all the multi-cells, which are SFN combined. Similarly the MBMS control channel should also be SFN combined, i.e. it must also share the same physical resources in all combined cells. Secondly all the resource blocks containing MBMS shall use the common scrambling code in all the mixed cells within the SFN area. The main advantage of this approach is SFN combining gain and the users can move around the SFN area transparently while receiving the MBMS data.

SFN based MBMS transmission is also supported in E-UTRAN, see 3GPP TR 25.913, "Requirements for Evolved UTRA (E-UTRA) and Evolved UTRAN (E-UTRAN).

Cell Reselection and System Information Reading

In WCDMA, when a UE in idle mode moves in a coverage area, it performs cell reselection. In other words the UE camps on the best cell and reads the system information, which is sent on the BCH channel, mapped on P-CCPCH (Primary common control physical channel), see 3GPP TS 25.211, "Physical channels and mapping of transport channels onto physical channels (FDD). In WCDMA the BCH is transmitted continuously, i.e. code multiplexed with other channels. The transmission bit rate (coded data rate) is around 30 kb/s. The UE requires up to 1 second for reading the entire system information broadcast on BCH. The UE in idle mode may also be required to read the system information in between the cell reselection in case there is any change in the system information as indicated by paging indication.

The main problem is the loss of MBMS data due to BCH reading in the case that the UE is receiving MBMS on the SFN network.

A problem with existing solutions is that in principle the SFN transmission could be interrupted to allow the UE to read other channels on the non-dedicated MBMS cells, especially the system information. Short interruptions to read paging and to make neighbour cell measurements are acceptable from the MBMS reception performance point of view. On the other hand, longer interruptions in the order of seconds (one or more) will severely degrade the MBMS reception. In the current solution, due to continuous BCH transmission, the UE in order to read BCH after cell reselection (reselection of non-dedicated MBMS cell) will be required to interrupt the MBMS reception for at least one second.

One solution to this problem is to have a dual receiver at the UE. This means the UE can receive MBMS data on one receiver and read BCH and other channels on another receiver. However, dual receivers add more complexity and increase cost. A dual receiver leads to more severe in-band inter-modulation products due to circuit non-linearity. It also generates more severe self-mixing effects due to local oscillator leakage via substrate or other coupling effects. In a homodyne receiver, this results in worse DC-carrier performance. In general, a two synthesizer solution could also give worse spurious emissions. In terms of implementation complexity the interface between RF (Radio Frequency) and BB (baseband) must be redesigned to support the additional reception. Similarly, support for baseband processing of an extra receiver chain is also needed.

SUMMARY

It is therefore an object of the present invention to provide a method where the problems referred to in the foregoing are solved. This is achieved by a method where the broadcast control channel (BCCH) that contains system information is not transmitted continuously, but rather it is transmitted in a time division multiplexed (TDM) fashion. More specifically, the invention relates to a method in a radio base station wherein the broadcast control channel (BCCH) comprising of system information is sent non-continuously and periodically at regular intervals. This prevents or at least minimizes MBMS data loss when a UE with a single receiver listens to a dedicated MBMS carrier. This TDM BCCH is in addition to the existing BCH channel, which is sent continuously on a non-dedicated MBMS carrier in release 6.

The invention furthermore relates to a radio base station comprising means for performing the method described in the foregoing.

The invention furthermore relates to a method in a user equipment, wherein the UE listens to a broadcast control channel (BCCH) comprising of system information, after cell reselection or after change in system information in a non-continuous manner at regular time intervals, and a user equipment comprising means for performing the method described.

In one embodiment the TDM of BCCH takes place on a non-dedicated MBMS carrier.

In another embodiment the TDM of BCCH takes place in a dedicated MBMS carrier on which the UE receives the MBMS data.

According to one aspect of the invention, the UE does not require a dual receiver to receive MBMS on a dedicated carrier and to decode system information (BCCH) from the non-dedicated MBMS carrier. Dual receivers lead to more severe in-band inter-modulation products, leakage, worse DC carrier performance etc, due to circuit non-linearity.

Furthermore, small MBMS data loss is achieved in the case that the BCCH is time multiplexed on non-dedicated MBMS carrier.

Another advantage is that there is no loss in MBMS data in the case that the BCCH is time multiplexed on the dedicated MBMS carrier.

BRIEF DESCRIPTION OF THE DRAWINGS

The foregoing and other objects, features and advantages of the invention will be apparent from the following detailed description of preferred embodiments as illustrated in the drawings.

DESCRIPTION

Figure 1:
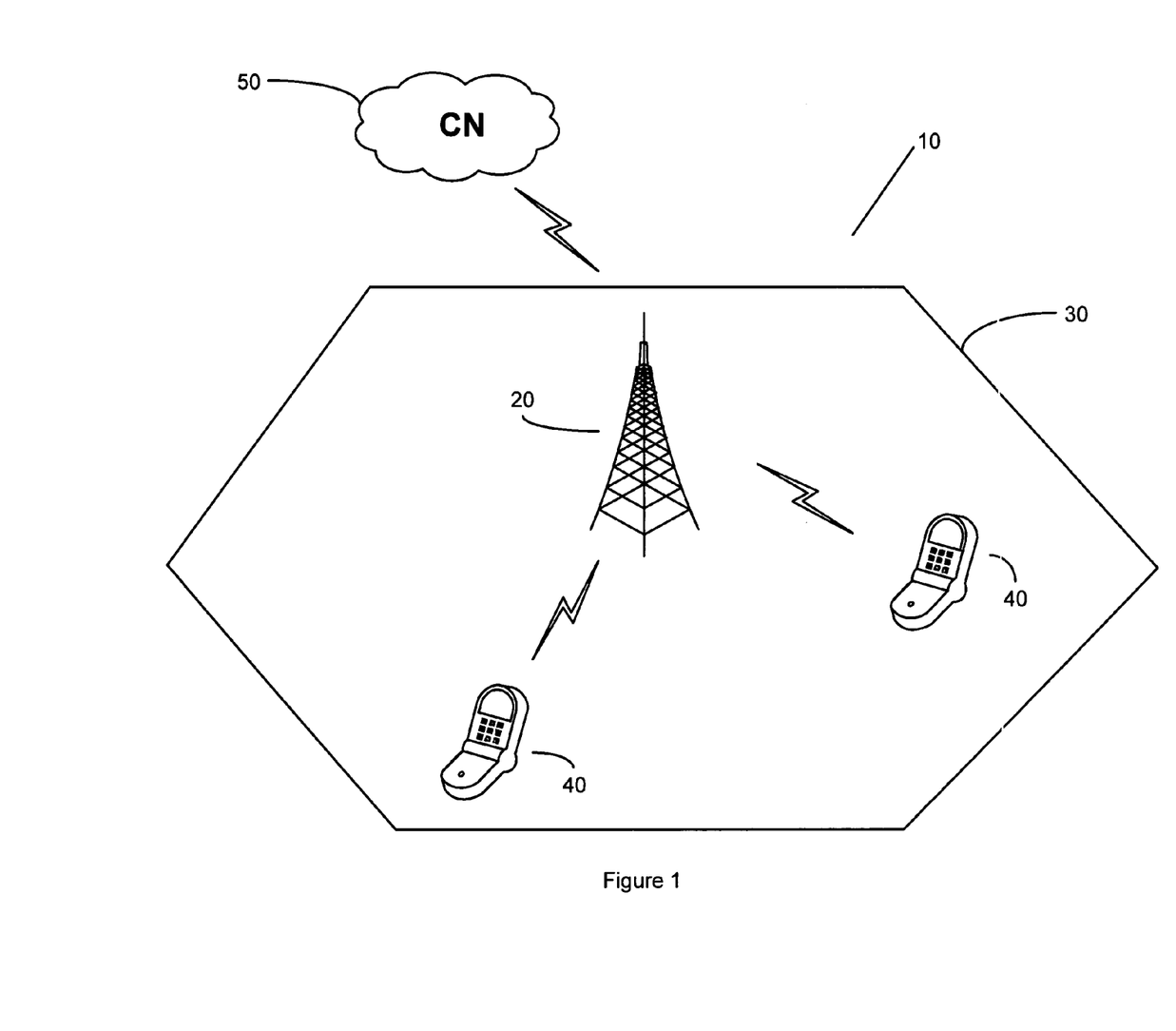
FIG. 1 illustrates part of a wireless telecommunications system according to the present invention.

FIG. 1 illustrates part of a wireless telecommunications network 10 according to the present invention.

The telecommunications network 10 comprises at least one radio base station 20 (alternatively called a network node, node B, or any other name familiar to those skilled in the art). The transmission area 30 of the radio base station 20 is shown as a hexagon surrounding the base station; this transmission area 30 is commonly referred to as a cell. Only one base station and its associated cell are shown for convenience; it will be appreciated that the network 10 will typically comprise many such base stations and cells. Cellular phones 40 (also referred to as user equipments) within the cell 30 receive transmissions from the base station 20 on one or more carriers, and send their own transmissions back to the base station 20. A core network (CN) 50, in communication with the base station 20, controls overall operation of the network 10.

Those skilled in the art will appreciate that many elements of the network 10 have been omitted for clarity. The operation of the base station 20 and the user equipments 40, in particular, is described in further detail below.

There follows a description of two embodiments (or approaches) to sending BCCH in TDM fashion.

The first embodiment is related to the case where the TDM of BCCH takes place on a non-dedicated MBMS carrier.

Time Multiplexing of BCCH

In this embodiment the BCCH is sent on the non-dedicated carrier with a certain periodicity. The BCCH information can be mapped either onto HS-DSCH or on FACH channel (Forward access channel) to all the UEs in the cell. This means the system information is duplicated on a new time multiplexed BCCH.

In one embodiment, the periodicity and duration of each transmission (or each BCCH burst) is standardized. Similarly the channelization codes on which BCCH (whether HS-DSCH or FACH) is mapped may also be standardized to some extent, e.g. blind demodulation.

The entire system information can either be sent during one transmission or it can be spread across several transmissions. The first case implies high peak bit rate whereas in the second case peak bit rate will be lower. However, similar average bit rates are achievable in both cases by having different periodicity of each BCCH burst. Typically each BCCH burst will be in the order of few TTIs (transmission time intervals), e.g. between 2 ms and 20 ms.

Scenario on Dedicated MBMS Carrier

The MBMS services can be either purely code multiplexed or they can be code and time multiplexed. This section explains how the UE may read BCCH on a non-dedicated carrier in different MBMS service multiplexing scenarios on a dedicated carrier.

Figure 2:
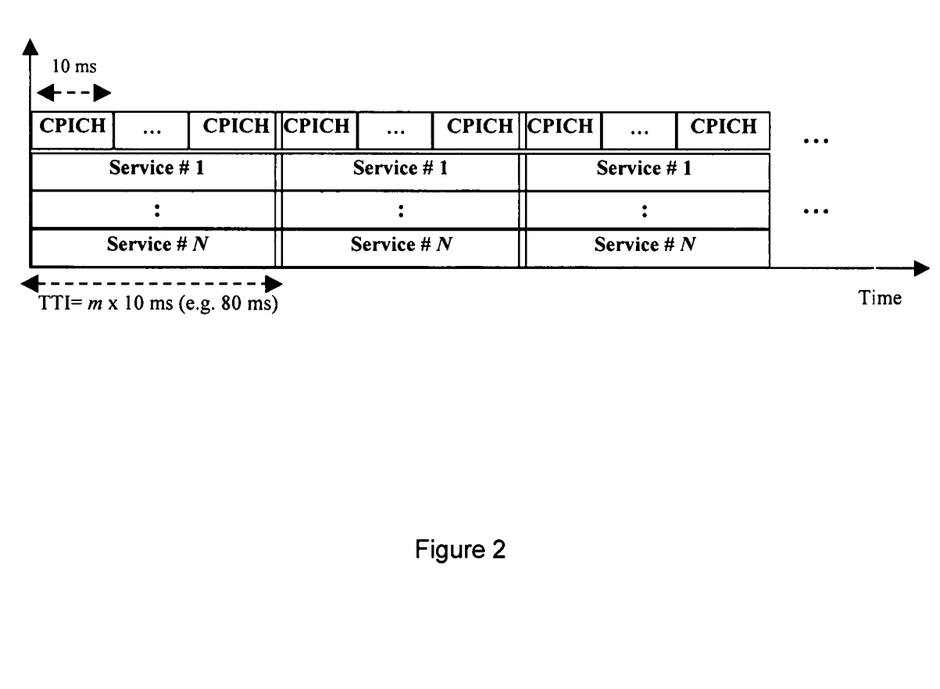
FIG. 2 illustrates MBMS transmission on a dedicated MBMS carrier.

FIG. 2 shows pure code multiplexing of MBMS services on a dedicated MBMS carrier. In this case the UE can listen to the BCCH information on the non-dedicated carrier by simply discarding the MBMS data on the dedicated MBMS carrier for a short period (i.e. BCCH burst duration). It should be noted that the UE will have to toggle between dedicated MBMS carrier and non-dedicated carrier to decode BCCH only after reselection of the non-dedicated MBMS cell. The toggling time is generally in the order of 100-200 ms.

Figure 3:
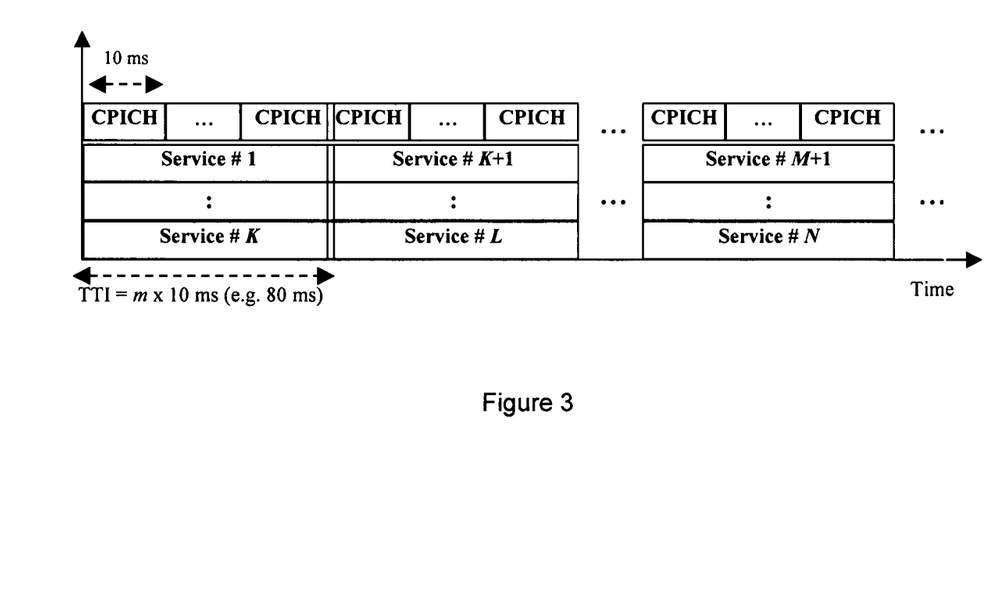
FIG. 3 illustrates MBMS services multiplexed on a dedicated carrier in TDM fashion.

FIG. 3 shows MBMS services that are both time and code multiplexed on the dedicated MBMS carrier. In this scenario the UE will partly lose MBMS data when a BCCH burst (on the non-dedicated MBMS carrier) coincides with the MBMS service which the UE is receiving. The MBMS TTI is expected to be much longer than the HS-DSCH or FACH channel that carries the BCCH burst. Hence, most likely only part of the MBMS data is lost and can be recovered by application level coding.

Reception of Channels other than BCCH

The main objective of UE toggling to a non-dedicated MBMS cell is to read the BCCH channel. However, a similar principle, where the UE periodically toggles to a non-dedicated MBMS cell is valid for receiving other services such as VoIP (Voice over IP). The reception of VoIP type services without significant MBMS data loss is possible since such services are transmitted at regular time intervals and the transmission burst duration is small.

TDM of BCCH on a Dedicated MBMS Carrier

The second embodiment is related to the case where the TDM of BCCH takes place on a dedicated MBMS carrier where the UE receives the MBMS data. In this case, the BCCH of the associated non-dedicated MBMS carrier is sent on the dedicated MBMS carrier in a time multiplexed manner with MBMS services. This means SFN sub-areas are defined with respect to BCCH transmission. The association between non-MBMS BCCH and BCCH transmission on dedicated MBMS cells is discussed below in the section entitled "SFN Sub-Area . . . " In addition to BCCH, other channels and services can also be multiplexed onto the dedicated MBMS carrier. This is further explained in the sections below entitled "MBMS Time Multiplexed with only BCCH" and "MBMS Multiplexed with BCCH and other Channels". One advantage of this approach is that the UE can also make neighbour cell measurements, i.e. measurements on non-dedicated MBMS cells, inter-RAT cells etc., during BCCH burst duration when the UE does not listen to BCCH. It should be noted that the UE needs to listen to BCCH only after cell reselection or in the case that there is a change in BCCH information as indicated by paging indication.

MBMS Time Multiplexed with only BCCH

Figure 4:
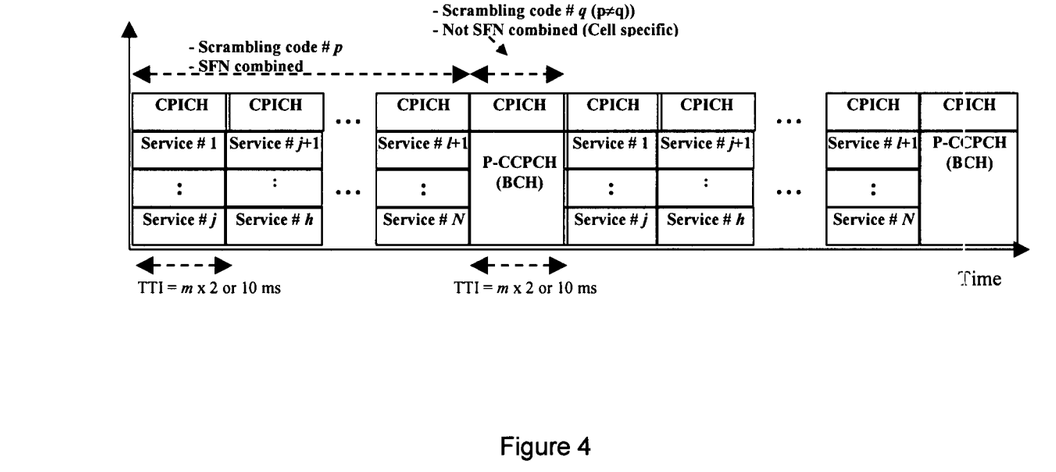
FIG. 4 illustrates TDM multiplexing of MBMS and non-MBMS services on a dedicated carrier.

FIG. 4 shows the scenario where only BCCH is time multiplexed with MBMS services on the dedicated carrier. Hence there are MBMS slots where only MBMS services are sent and there are periodic slots for BCCH where only system information is broadcasted.

During MBMS transmission (i.e. MBMS slots), all dedicated MBMS cells within an SFN area use the common scrambling code. Secondly the MBMS services can be either code multiplexed or both code and time multiplexed during MBMS slots. On the other hand during a BCCH transmission slot the scrambling code is specific to each dedicated MBMS cell (or SFN sub-area). This allows the UE to identify the SFN sub-area. In this way different system information corresponding to the non-MBMS cells can be sent on different dedicated MBMS cells (or SFN sub-area during a BCCH slot).

The periodicity of BCCH bursts and the BCCH burst duration used on the dedicated MBMS cells can be standardized or can be acquired by reading system information from non-dedicated MBMS cell during initial cell selection. The scrambling code information is mapped onto the CPICH as in release 6. Hence, the UE can identify the MBMS sub-area by demodulating CPICH.

MBMS Multiplexed with BCCH and Other Channels

Figure 5:
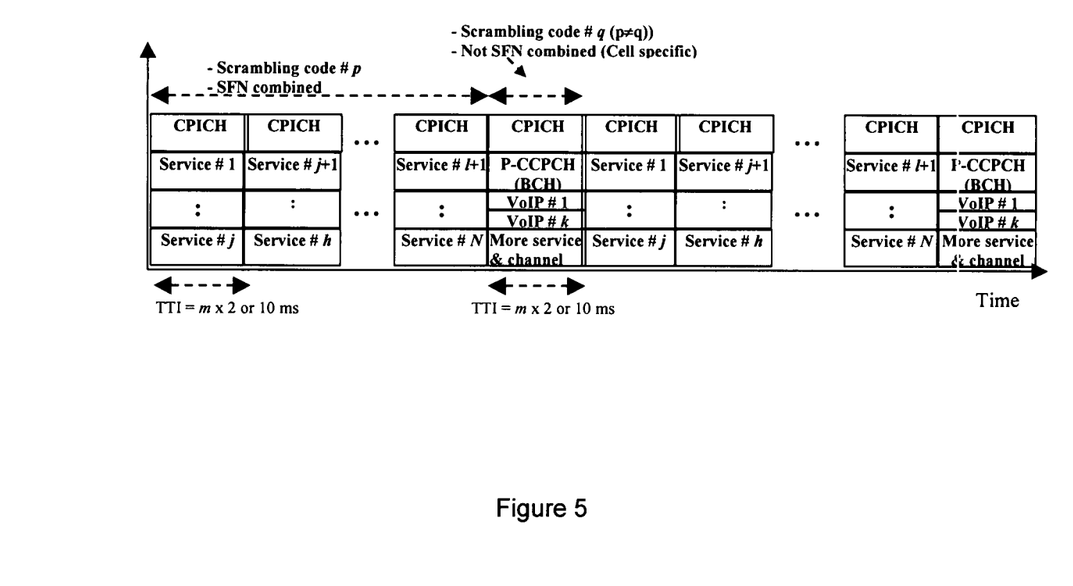
FIG. 5 illustrates TDM multiplexing of MBMS and non-MBMS services on a dedicated carrier.

This is similar to the arrangement in the previous section referring to Time Multiplexing of BCCH, but in addition there are other services code multiplexed with the BCCH transmission. FIG. 5 shows time multiplexing of MBMS services with BCCH transmission as well as other services and common channels. During MBMS time periods, which may comprise several TTIs, the MBMS services are sent via SFN using the same scrambling code in all cells in the SFN network. However, BCCH and non-MBMS services are sent periodically with a dedicated MBMS cell (or SFN sub-area) specific scrambling code. For the bi-directional services such as VoIP the uplink transmission during the BCCH slot will take place on the non-dedicated MBMS carrier. Due to implementation simplicity and due to closed loop power control, users that can receive downlink and uplink transmissions from the same base station site may receive bi-directional services on dedicated MBMS carrier.

SFN Sub-Area: Association Between BCCH on Dedicated and Non-Dedicated MBMS Carriers There are three possible scenarios with respect to the coverage between dedicated and non-dedicated MBMS cells.

Similar Coverage: Dedicated and Non-Dedicated MBMS Cells

Figure 6:
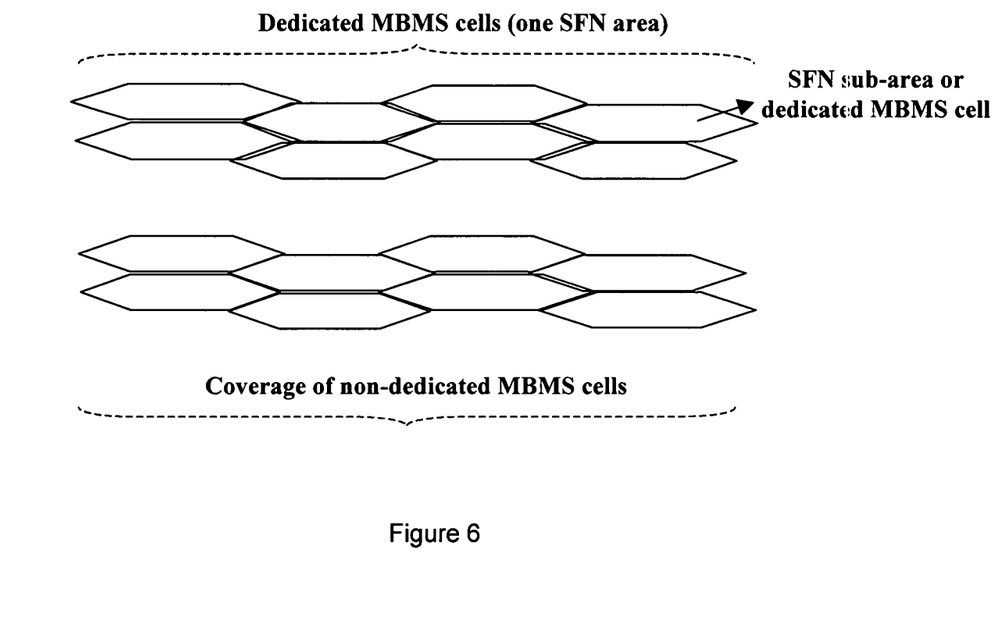
FIG. 6 illustrates similar coverage of non-dedicated and dedicated MBMS cells.

This is the simplest scenario where every non-dedicated MBMS cell and dedicated MBMS cell within SFN area have similar coverage as shown in FIG. 6.

This means the BCH in a dedicated MBMS cell can be the same as in the corresponding non-dedicated cell. In one embodiment the BCH in the dedicated MBMS cell is the sub-set of the BCH in the corresponding dedicated MBMS cell. This will lower the dedicated MBMS BCH overheads and speed up BCH reading time.

Non-Dedicated MBMS Cell Coverage Larger than Dedicated MBMS Cell

Figure 7:
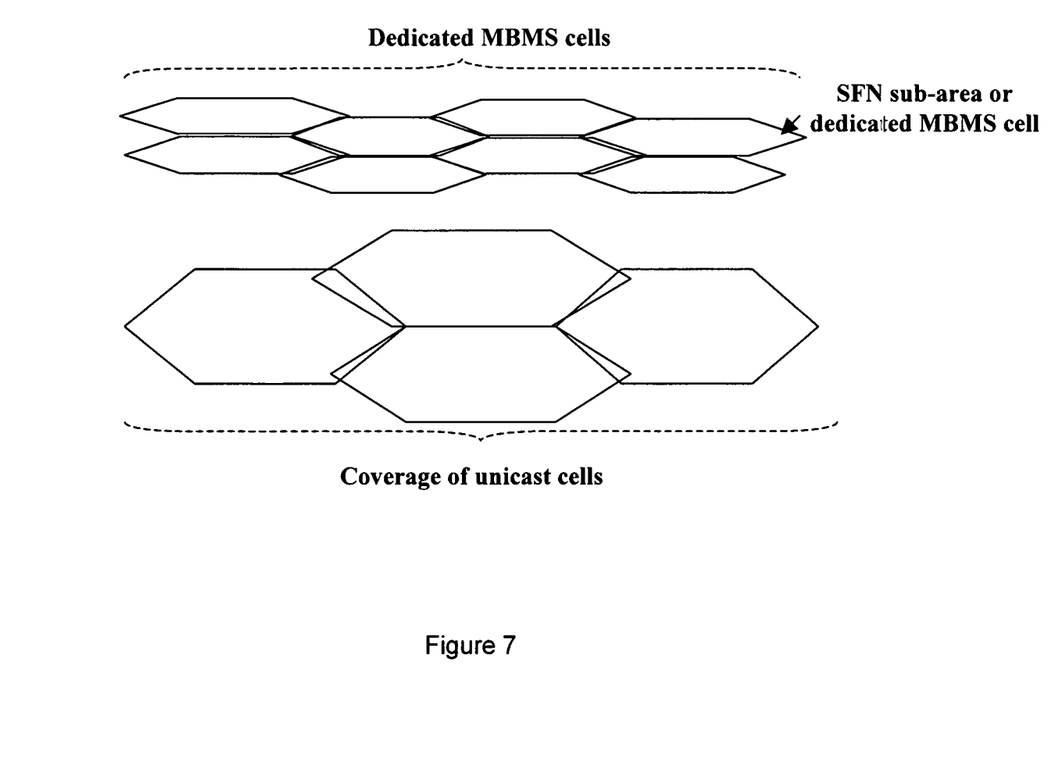
FIG. 7 illustrates non-dedicated MBMS cells that have larger coverage than dedicated MBMS cells.

In this case all the dedicated MBMS cells lying within the same non-dedicated MBMS cell coverage shall have similar BCH content as shown in FIG. 7. The BCH content shall correspond to the BCH in the non-dedicated MBMS cell.

Non-Dedicated MBMS Cell Coverage Smaller than Dedicated MBMS Cell

Figure 8:
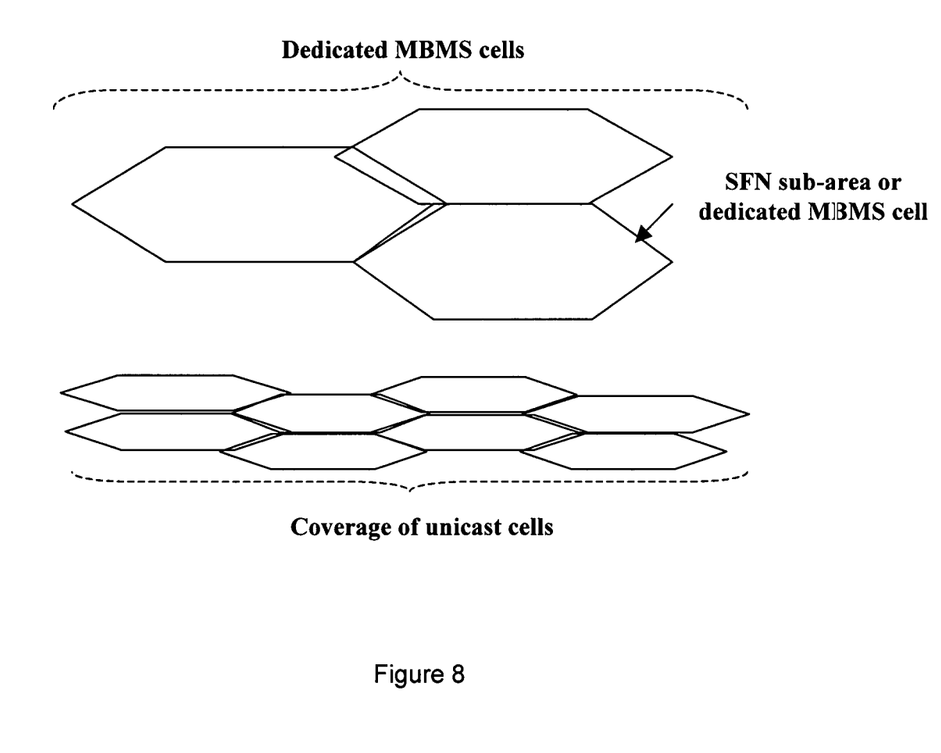
FIG. 8 illustrates dedicated MBMS cells that have larger coverage than the non-dedicated MBMS cells.

This is a more complicated scenario since several non-dedicated MBMS cells will be within one large dedicated MBMS cell as shown in FIG. 8. One solution is to multiplex several BCCH (logical channels) pertaining to each non-dedicated MBMS cell onto one BCH. The UE may do cell reselection (or handover) on the non-dedicated MBMS cells as usual, select the best cell and attain the cell identification of the best non-dedicated MBMS cell. The UE may then read only the relevant BCCH (i.e. corresponding to the best/selected non-dedicated MBMS cell) on the dedicated MBMS cell.

The major impact will be longer reading time since several BCCHs pertaining to the non-dedicated MBMS cells are to be multiplexed onto the same BCH. One simplification could be to combine all system information common in all cells on one logical channel (BCCH_common) and cell specific system information on separate logical channels (BCCH_cell_specific). As before all these logical channels may be multiplexed onto the same BCH on the dedicated MBMS cell.

Applicability to E-UTRAN

As mentioned before SFN MBMS shall also be supported in E-UTRAN, see 3GPP TR 25.913, "Requirements for Evolved UTRA (E-UTRA) and Evolved UTRAN (E-UTRAN). In E-UTRAN, the UE shall also be required to read the system information (BCCH) from a non-dedicated MBMS cell. Hence, the proposed solution of having BCCH time multiplexed with MBMS services on a dedicated MBMS carrier is applicable in E-UTRAN as well.

The invention should not be limited to the example described in the foregoing, but is intended to cover various modifications within the scope of the appended claims.

The invention claimed is:

1. A method of operation of a radio base station in a wireless telecommunications system, in which system information is transmitted on a broadcast control channel, the method comprising:

transmitting said system information on the broadcast control channel continuously on a first carrier, which is a non-dedicated Multimedia Broadcast Multicast Server (MBMS) carrier; and transmitting said system information on the broadcast control channel non-continuously and periodically at regular intervals on a second carrier, said second carrier being a dedicated MBMS carrier, and wherein MBMS services and the broadcast control channel are strictly time-multiplexed on said dedicated MBMS carrier;

wherein the MBMS services are transmitted on the dedicated MBMS carrier using a first scrambling code; and wherein the broadcast control channel is transmitted on the dedicated MBMS carrier using a second scrambling code.

2. A method as claimed in claim 1, wherein the step of transmitting the broadcast control channel non-continuously and periodically at regular intervals comprises: transmitting the broadcast control channel non-continuously and periodically at regular intervals on the first carrier.

3. A method as claimed in claim 2, wherein the step of transmitting the broadcast control channel non-continuously and periodically at regular intervals on the first carrier comprises transmitting the broadcast control channel with predetermined channelization codes.

4. A method as claimed in claim 2 comprising transmitting the entire system information in one transmission.

5. A method as claimed in claim 2 comprising transmitting the entire system information in a plurality of transmissions.

6. A method as claimed in claim 1, comprising transmitting the broadcast control channel non-continuously and periodically on a HS-DSCH (high-speed downlink shared channel).

7. A method as claimed in claim 1, comprising transmitting the broadcast control channel non-continuously and periodically on a FACH (forward access channel).

8. A method as claimed in claim 1, wherein the second scrambling code is specific to a cell in which the transmissions are taking place.

9. A method as claimed in claim 1, wherein the size of the cells on the first carrier generally corresponds to the size of the cells on the dedicated MBMS carrier, and wherein the broadcast control channel transmitted on the first carrier is the same as the broadcast control channel transmitted on the dedicated MBMS carrier.

10. A method as claimed in claim 1, wherein cells on the first carrier are generally larger than the cells on the dedicated MBMS carrier, and wherein the broadcast control channel transmitted on the first carrier is generally the same as the broadcast control channel transmitted on the dedicated MBMS carrier.

11. A method as claimed in claim 1, wherein cells on the first carrier are generally smaller than the cells on the dedicated MBMS carrier, the method comprising: transmitting broadcast control channel information, relating to a plurality of cells, on the first carrier.

12. A method as claimed in claim 11, comprising: transmitting common system information relating to all of the plurality of cells on a first logical channel; and
transmitting system information relating to individual cells of the plurality of cells on respective different logical channels.

13. A method as claimed claim 1, further comprising: transmitting data relating to other services on the dedicated MBMS carrier, during time periods in which the broadcast control channel is transmitted, code multiplexed therewith.

14. A radio base station, comprising:
a transmitter configured to transmit system information on a broadcast control channel continuously on a first carrier, which is a non-dedicated Multimedia Broadcast Multicast Server (MBMS) carrier;
the transmitter further configured to transmit said system information on the broadcast control channel non-continuously and periodically at regular intervals on a second carrier, said second carrier being a dedicated MBMS carrier, wherein MBMS services and the broadcast control channel are strictly time-multiplexed on said dedicated MBMS carrier:
wherein the MBMS services are transmitted on the dedicated MBMS carrier using a first scrambling code; and
wherein the broadcast control channel is transmitted on the dedicated MBMS carrier using a second scrambling code.

15. A method of operation of a user equipment in a wireless telecommunications system, in which system information is transmitted on a broadcast control channel, the method comprising:
receiving said system information on the broadcast control channel continuously on a first carrier, which is a non-dedicated Multimedia Broadcast Multicast Server (MBMS) carrier; and
receiving said system information on the broadcast control channel non-continuously and periodically at regular intervals on a second carrier, said second carrier being a dedicated MBMS carrier, wherein MBMS services and the broadcast control channel are strictly time-multiplexed on said dedicated MBMS carrier;
wherein the MBMS services are received and demodulated on the dedicated MBMS carrier using a first scrambling code; and
wherein the broadcast control channel is received and demodulated on the dedicated MBMS carrier using a second scrambling code.

16. A method as claimed in claim 15, wherein the step of receiving the broadcast control channel non-continuously and periodically at regular intervals comprises: receiving the broadcast control channel non-continuously and periodically at regular intervals on the first carrier.

17. A method as claimed in claim 16, wherein the step of receiving the broadcast control channel non-continuously and periodically at regular intervals on the first carrier comprises receiving and demodulating the broadcast control channel with predetermined channelization codes.

18. A method as claimed in claim 17 comprising receiving the entire system information in one transmission.

19. A method as claimed in claim 17 comprising receiving the entire system information in a plurality of transmissions.

20. A method as claimed in claim 15, comprising receiving the broadcast control channel non-continuously and periodically on a HS-DSCH (high-speed downlink shared channel).

21. A method as claimed in claim 15, comprising transmitting the broadcast control channel non-continuously and periodically on a FACH (forward access channel).

22. A method as claimed in claim 15, wherein the second scrambling code is specific to a cell in which the transmissions are taking place.

23. A method as claimed in claim 15, wherein the size of the cells on the first carrier generally corresponds to the size of the cells on the dedicated MBMS carrier, and wherein the broadcast control channel received on the first carrier is the same as the broadcast control channel received on the dedicated MBMS carrier.

24. A method as claimed in claim 15, wherein cells on the first carrier are generally larger than the cells on the dedicated MBMS carrier, and wherein the broadcast control channel received on the first carrier is generally the same as the broadcast control channel received on the dedicated MBMS carrier.

25. A method as claimed in claim 15, wherein cells on the first carrier are generally smaller than the cells on the dedicated MBMS carrier, the method comprising: receiving broadcast control channel information, relating to a plurality of cells, on the first carrier.

26. A method as claimed in claim 25, comprising: receiving common system information relating to all of the plurality of cells on a first logical channel; and receiving system information relating to individual cells of the plurality of cells on respective different logical channels.

27. A method as claimed in claim 15, further comprising: receiving data relating to other services on the dedicated MBMS carrier, during time periods in which the broadcast control channel is transmitted, code multiplexed therewith.

* * * * *

UNITED STATES PATENT AND TRADEMARK OFFICE
CERTIFICATE OF CORRECTION

PATENT NO. : 8,553,604 B2
APPLICATION NO. : 12/513096
DATED : October 8, 2013
INVENTOR(S) : Kazmi et al.

Page 1 of 1

It is certified that error appears in the above-identified patent and that said Letters Patent is hereby corrected as shown below:

On the Title Page, in Item (56), under "FOREIGN PATENT DOCUMENTS", in Column 2, Line 2, delete "WO 2004/102636" and insert -- W0 2004/102836 --, therefor.

On the Title Page, in the Figure, delete "-Scrambling code # q (p≠q))" and insert -- -Scrambling code # q (p≠q) --, therefor.

In the Drawings:

In Fig. 4, Sheet 4 of 8, delete "-Scrambling code # q (p≠q))" and insert -- -Scrambling code # q (p≠q) --, therefor.

In Fig. 5, Sheet 5 of 8, delete "-Scrambling code # q (p≠q))" and insert -- -Scrambling code # q (p≠q) --, therefor.

In the Specification:

In Column 3, Line 42, delete "DESCRIPTION""" and insert -- DETAILED DESCRIPTION --, therefor.

In the Claims:

In Column 7, Line 37, in Claim 13, delete "claimed claim" and insert -- claimed in claim --, therefor.

In Column 7, Line 52, in Claim 14, delete "carrier:" and insert -- carrier; --, therefor.

Signed and Sealed this
Eleventh Day of February, 2014

Michelle K. Lee
*Deputy Director of the United States Patent and Trademark Office*